United States Patent
Rayfield et al.

(10) Patent No.: US 7,908,836 B1
(45) Date of Patent: Mar. 22, 2011

(54) DRAPER HEADER WITH MULTIPLE SIDED CUT CROP BARRIER INTERFACE BETWEEN THE CUTTER BAR AND DRAPER CANVAS

(75) Inventors: James F. Rayfield, New Holland, PA (US); John J. Conroy, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/839,742

(22) Filed: Jul. 20, 2010

(51) Int. Cl.
*A01D 43/00* (2006.01)

(52) U.S. Cl. ........................................... 56/181; 56/208

(58) Field of Classification Search ............... 56/208, 56/181, 14.5, 260, 296, 158, 207, DIG. 17, 56/123; 198/699, 841
See application file for complete search history.

(56) References Cited

U.S. PATENT DOCUMENTS

| | | |
|---|---|---|
| 1,862,101 A | 6/1932 | Pax |
| 1,881,411 A | 10/1932 | Love et al. |
| 2,235,602 A | 3/1941 | Biesemeyer |
| 2,347,365 A | 4/1944 | Paradise |
| 2,608,041 A | 8/1952 | Schoenrock |
| 2,720,743 A | 10/1955 | Prather |
| 4,590,751 A | 5/1986 | Stephenson |
| 5,459,986 A | 10/1995 | Talbot et al. |
| 6,351,931 B1 | 3/2002 | Shearer |
| 7,412,816 B2 * | 8/2008 | Coers et al. ...................... 56/208 |
| 7,472,533 B2 | 1/2009 | Talbot et al. |
| 7,478,521 B2 * | 1/2009 | Coers et al. ...................... 56/208 |
| 7,600,364 B2 | 10/2009 | Lovett et al. |
| 2005/0022491 A1 | 2/2005 | Zurn et al. |
| 2008/0092508 A1 * | 4/2008 | Talbot et al. ..................... 56/181 |

* cited by examiner

*Primary Examiner* — Árpád Fábián-Kovács
(74) *Attorney, Agent, or Firm* — Michael G. Harms; Patrick M. Sheldrake

(57) ABSTRACT

The draper canvas of the header includes a strip of a resilient material that stands outwardly and forwardly of a front edge thereof and has an outer barrier surface, an inner barrier surface, and a front barrier surface received and contained in structure of a cutter bar and a front draper support plate having a plurality of barrier elements in face-to-face closely spaced relation with the barrier surfaces to form a multiple sided barrier interface between the cutter bar and draper fabric for excluding cut crop from the interior of the header. The strip runs within the container structure with minimal contact to reduce friction and wear.

15 Claims, 7 Drawing Sheets the header. In operation, cut crop will fall rearwardly from the cutter bar onto the draper assembly and be transported longitudinally thereby.

DRAPER HEADER WITH MULTIPLE SIDED CUT CROP BARRIER INTERFACE BETWEEN THE CUTTER BAR AND DRAPER CANVAS

TECHNICAL FIELD

This invention relates to a header for cutting and transporting a standing crop with a transverse leading cutter bar, and, more particularly, to header which provides a multiple sided barrier interface to prevent entry of cut crop between a front edge of a draper canvas and the cutter bar, which also advantageously reduces friction and resulting wear of the draper canvas.

BACKGROUND ART

Draper headers generally include a header frame, an elongate cutter bar along a front edge of the frame including a cutter bar beam which carries a plurality of knife guards for guiding reciprocating movement of a sickle knife across a front edge of the cutter bar. On the header is also mounted a draper assembly including a first and second draper guide roller each arranged at a respective end of the draper assembly spaced apart along the cutter bar with an axis of each roller extending substantially at right angles to the cutter bar, a draper canvas forming a continuous loop of flexible material wrapped around the rollers so as to define a front edge of the canvas adjacent the cutter bar, a rear edge of the canvas spaced rearwardly of the cutter bar, an upper run of the canvas on top of the roller and a lower run of the canvas below the rollers. The cut crop thus falls rearwardly onto the upper run of the canvas and is transported longitudinally of the header. Generally, between the draper rollers there is provided a support plate assembly for the upper run of the draper canvas to prevent sagging.

The header of this type can be used simply for forming a swath in which case the material is carried to a discharge opening of the header and deposited therefrom onto the ground. Headers of this type can also be used for feeding a combine harvester so that the materials are carried to an adapter member positioned at the discharge opening of the header for carrying the materials from the discharge opening into the feeder housing of the combine harvester. Yet further, headers of this type can be used for hay conditioners in which the material from the discharge opening is carried into crushing rolls. It will be appreciated, therefore, that the use of the header is not limited to particular types of agricultural machine but can be used with any such machine in which it is necessary to cut a standing crop and to transport that crop when cut longitudinally of the header for operation thereon.

The draper canvas normally comprises a fabric which is coated with a rubber material which is then vulcanized after forming of the fabric into the required shape and after attachment thereto of transverse slats. There is an interface between the outer surface of the draper canvas and the upper surface of the cutterbar over which the cut crop, and any material carried thereby, will pass as the cut crop is transferred onto the draper canvas. It is generally undesirable for the cut crop and material carried thereby to enter this interface, as it can collect within the internal cavities of the header, particularly in the area between the upper and lower runs of the draper canvas, so as ride on the lower run, tumble and build up heat, and be carried between the canvas and the rollers, to increase friction and wear and decrease canvas and bearing life.

Various seal arrangements have been proposed for the sides or ends of draper and conveyor canvas belts to reduce or prevent infiltration of cut crop and other material, e.g., dust, to reduce the above problems and increase canvas and other component life.

Reference an early seal arrangement disclosed in Paradise U.S. Pat. No. 2,347,365 issued Apr. 25, 1944 which illustrates use of a thicker fabric sealing strip on the end of a draper canvas which is received in and slides along a channel, wherein the top and bottom surfaces of the sealing strip engage and slide along the top and bottom surfaces defining the channel for sealing and preventing infiltration of crop and other material past the channel. However, it can be observed that the bottom surface of the sealing strip also supports the adjacent portion of the draper fabric during the sliding movement, and there is a large gap between the end of the strip and the side of the channel. As a result, the bottom surface of the strip is subject to friction and resulting wear, and will eventually become the sole sealing means to prevent infiltration of cut crop and other material into the inner regions of the draper.

Reference also, Talbot U.S. Pat. No. 5,459,986 issued Oct. 24, 1995 which is reported to have achieved satisfactory seal results and has been used for many years. However, it again provides only a single seal, located between a bottom surface of a rearwardly extending element of the cutter bar and a front edge portion of the upper surface of the canvas. Again, an observed shortcoming, is that as the single seal wears, cut crop will more easily enter the interface between the cutter bar and draper canvas, so as to build up and result in increased friction and canvas wear.

Reference also Shearer U.S. Pat. No. 6,351,931 issued Mar. 5, 2002, which discloses an additional guide bead on the outer surface of the canvas which runs in contact with the edge of the element of the cutter bar, which is reported by the owners of that and the above referenced Talbot patent to have failed to provide expected improvements over the seal arrangement of the Talbot patent. It is also observed that the guide bead presents an upstanding obstacle that can inhibit smooth flow of cut crop, and particularly grain, over the transition from the cutterbar to the draper canvas.

Reference further, Talbot et al. U.S. Pat. No. 7,472,533 issued Jan. 6, 2009, also to the assignee of the above referenced Talbot and Shearer patents, which discloses an arrangement including a resilient strip along the front edge of the draper canvas which cooperates with a rearwardly projecting element of the cutter bar extending over the upper run of the canvas to form a seal. This arrangement eliminates the obstacle of the Shearer patent. However, it is observed that, again, only a single seal interface is provided which can loose effectiveness over time as a result of friction and wear.

What is sought therefore, is a manner of creating a barrier to passage of cut crop and material carried thereby, through the interface between the cutter bar and the draper canvas of a header, which overcomes one or more of the shortcomings set forth above.

SUMMARY OF THE INVENTION

What is disclosed is a manner of creating a barrier to passage of cut crop and material carried thereby, through the interface between the cutter bar and the draper canvas of a header, which overcomes one or more of the shortcomings set forth above.

According to a preferred aspect of the invention, a typical header with which the invention is used includes a header frame, an elongate cutter bar arranged along a front edge of the frame, and a draper assembly mounted on the header frame rearwardly of the cutter bar such that cut crop will fall onto the draper assembly for transportation longitudinally of the header. The draper assembly includes a first and a second draper guide roller each arranged at a respective end of the draper assembly spaced apart along the cutter bar with an axis of each guide roller arranged substantially at right angles to the cutter bar. The draper assembly also includes a draper canvas forming a continuous loop of flexible material wrapped around the rollers so as to define an elongate upper run of the draper canvas on top of the rollers and an elongate lower run of the draper canvas below the rollers. This defines an outer surface of the draper canvas which faces outwardly of the loop and the outer surface forms the upper surface of the upper run and the lower surface of the lower run, and an opposed inner surface of the draper canvas which faces inwardly of the loop. A front edge of the upper run of the draper canvas is disposed rearwardly of a rear portion of the cutter bar, and the draper assembly includes a front draper support plate defining a substantially horizontal support surface lying under the upper run adjacent the front edge thereof and extending therealong between the first and second guide rollers.

According to another preferred aspect of the invention, the draper canvas has a front edge including a strip of a resilient material that stands outwardly from the outer surface. This strip has an outer barrier surface located outwardly of the outer surface of the draper canvas, an inner barrier surface facing oppositely of the outer barrier surface, a front barrier surface extending between the outer barrier surface and the inner barrier surface, and a rear surface facing oppositely of the front barrier surface and bounding the outer surface of the draper canvas. The cutter bar includes an elongate front barrier element extending along the upper run of the draper canvas in closely spaced, face-to-face relation to the front barrier surface of the strip, and an elongate upper barrier element extending rearwardly over the outer barrier surface of the strip along the upper run of the draper canvas in closely spaced, face-to-face relation to the outer barrier surface and angularly related to the front barrier element. Further, one of the cutter bar or the front draper support plate includes an elongate lower barrier element angularly related to the front barrier element and extending beneath and in closely spaced, face-to-face relation to the inner barrier surface of the strip.

As an advantage of the invention, the angularly related closely spaced, face-to-face relationships form a multiple sided interface between the cutter bar and the draper canvas, which acts as a barrier to passage of cut crop and material carried thereby through the interface, by requiring any cut crop, and material carried thereby, to not only infiltrate and pass through all three of the individual face-to-face interfaces, but to also change direction, from forward to downward to rearward, to reach the interior region of the header, all with the cut crop flow direction being rearward and sideward in the direction of the canvas travel only.

As another advantage, the three sided interface contains or captures the strip, and the canvas tension can be maintained, such that only minimal contact occurs between the surfaces in the face-to-face, closely spaced relationships, particularly such that the bottom surface of the strip is cantilevered, and supported by the draper canvas, and does not materially support the canvas, so as to minimize friction, resultant wear, and extend the life of the strip and draper canvas.

As another preferred aspect of the invention, the lower barrier element extends toward the front from the front draper support plate, and a small gap exists between the front edge of the lower barrier element and the front barrier element, through which only small amounts of material can pass, so as not to build up in the space between the front barrier element of the cutter bar and the front barrier surface of the strip. The header can be additionally constructed to allow this small infiltrating material to fall through the header to the ground surface below, and thus not build up to any significant extent within the header.

DETAILED DESCRIPTION OF THE INVENTION

Figure 1:
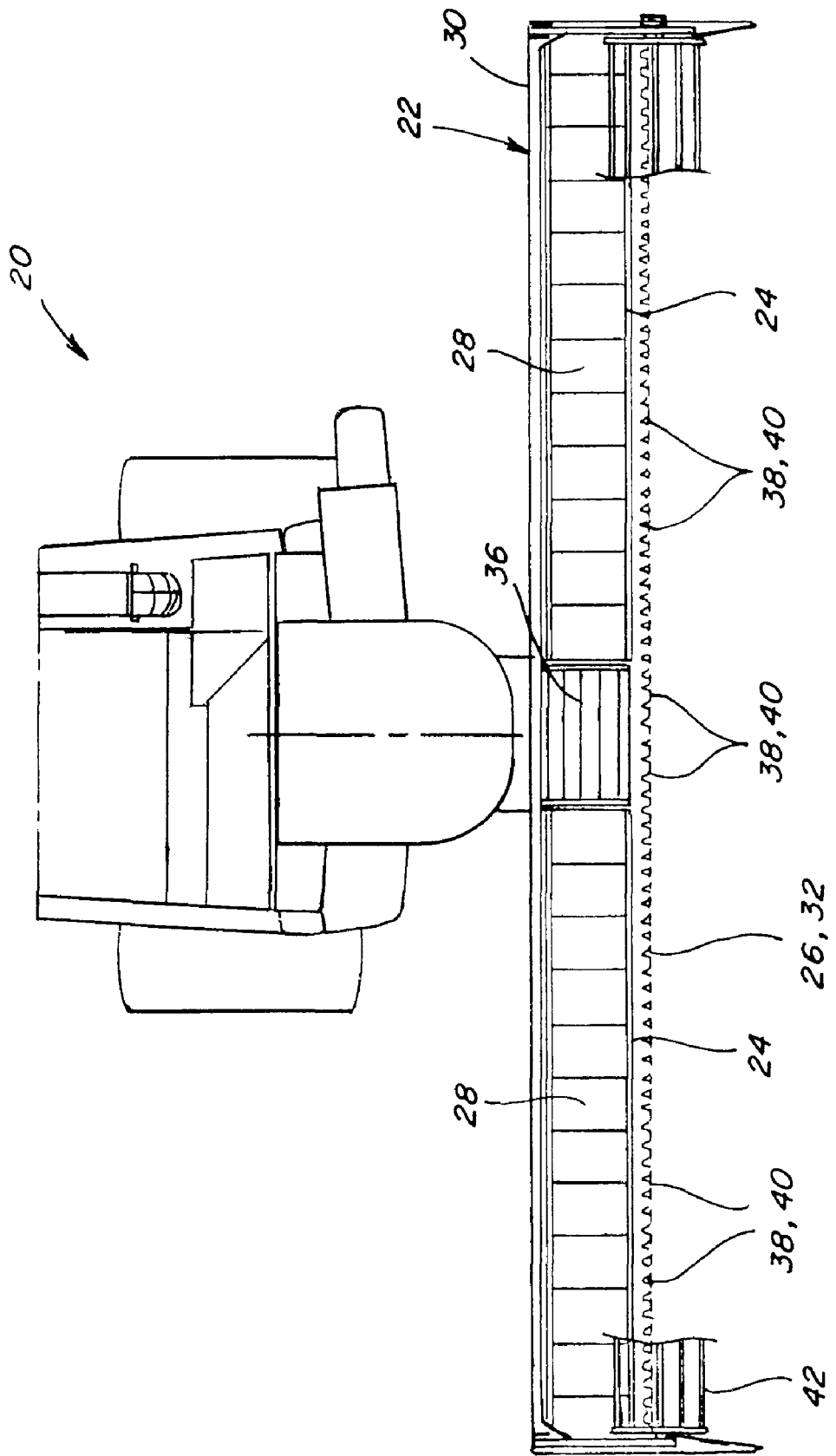
FIG. 1 is a top view of a harvesting machine including a header having a multiple sided cut crop barrier interface between a cutter bar and draper canvas of the header according to the invention.

Referring now to the drawings, a preferred embodiment of the invention will be described, as will several prior art devices. In FIG. 1, a representative harvester 20, which is a combine harvester of well-known construction, is shown, including a draper header 22 incorporating a multiple sided cut crop barrier interface 24 between an elongate sidewardly extending cutter bar 26 and a front edge of an elongate sidewardly extending draper canvas 28 of header 22, which effectively prevents entry of cut crop and material carried thereby into the interior of the header, while reducing friction between the draper canvas and cutter bar, so as to provide better wearability and extended draper fabric life.

Header 22 comprises a frame 30, one element of which is shown extending forwardly from a rear support frame structure (not shown) to cutter bar 26. Frame 30 of header 22 can have a variety of forms, but will generally comprise a structure of sheet metal members configured for supporting at least one elongate sidewardly extending cutter bar assembly 32 comprising cutter bar 26, as well as at least one elongate sidewardly extending draper assembly 34 comprising a draper canvas 28, and other aspects of header 22.

Here, it can be observed that header 22 includes two draper assemblies 34 operable for conveying cut crop convergingly to a central conveyor 36, in the well known manner, as generally denoted by arrows A, as harvester 20 moves in a forward direction denoted by arrow F through a field while cutting the crops.

Conveyor 36, in turn, will convey the cut crop into a feeder of harvester 20, which will convey the crop into harvester 20 for threshing and separation of grain therefrom, also in the well known manner.

Cutter bar assembly 32 shown here generally includes a sideward, longitudinally extending knife guard 38 having a plurality of forward projecting fingers 40, and which carries an elongate sickle comprised of discrete triangular knife sections which are sidewardly reciprocated through and relative to fingers 40 for cutting crop as harvester moves in forward direction F. A reel 42 extends across header 22 just above cutter bar assembly 32, and operates in the well known manner for feeding the crop to the cutter bar for cutting.

Figure 2:
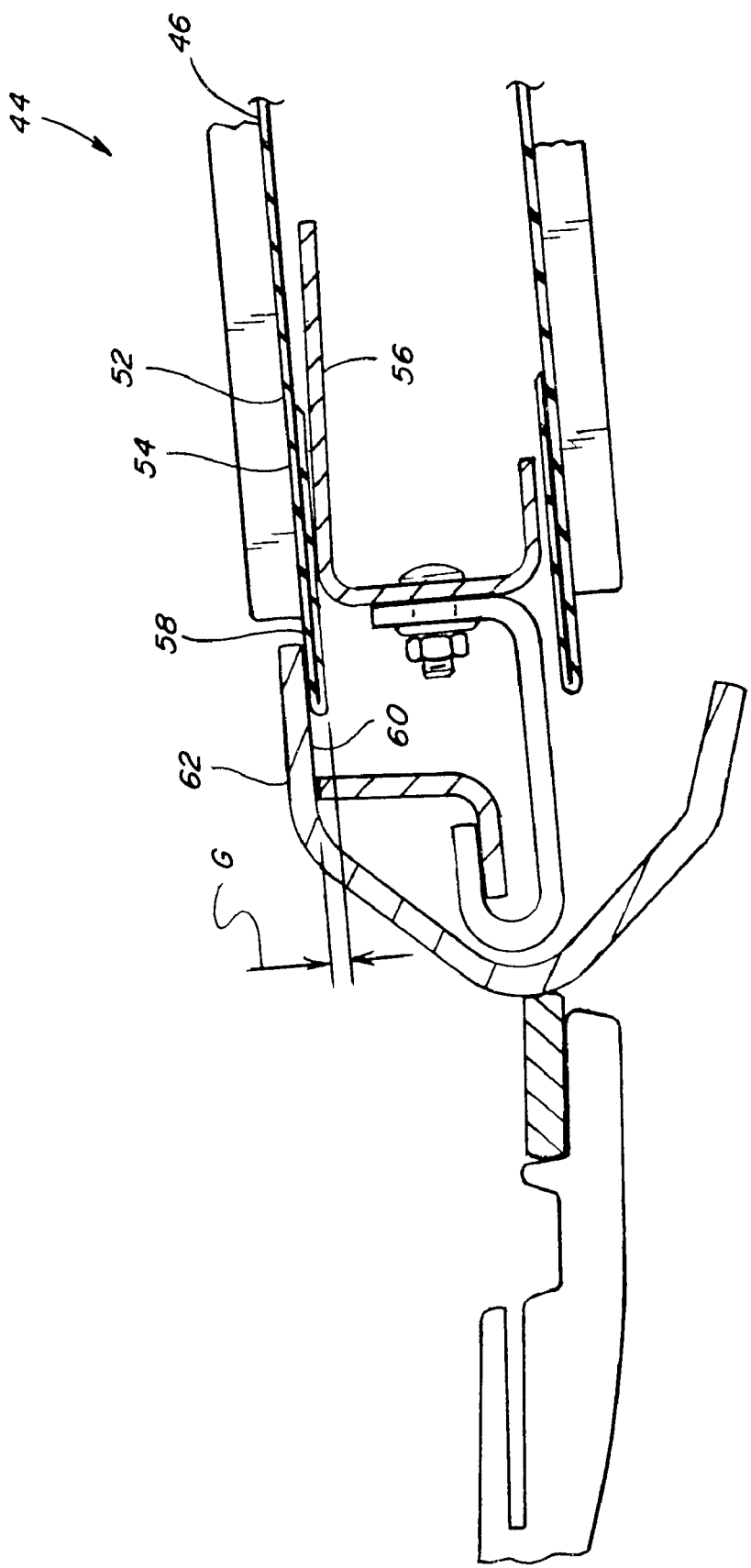
FIG. 2 is a fragmentary sectional view of a prior art header, showing a known seal arrangement between a draper canvas and cutter bar of the header.
Figure 3:
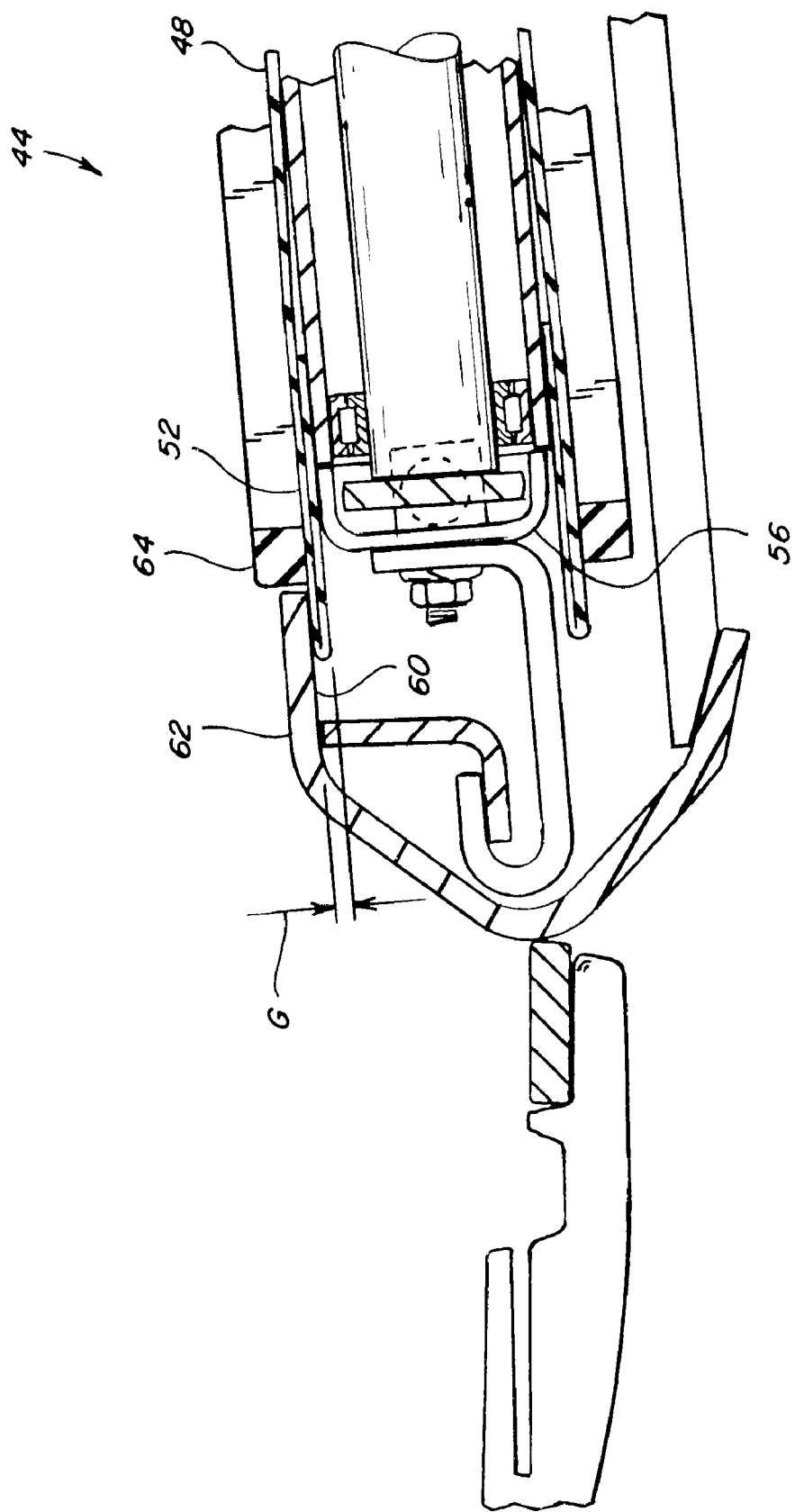
FIG. 3 is a fragmentary sectional view of another prior art header, showing another known seal arrangement between a draper canvas and cutter bar of the header.
Figure 4:
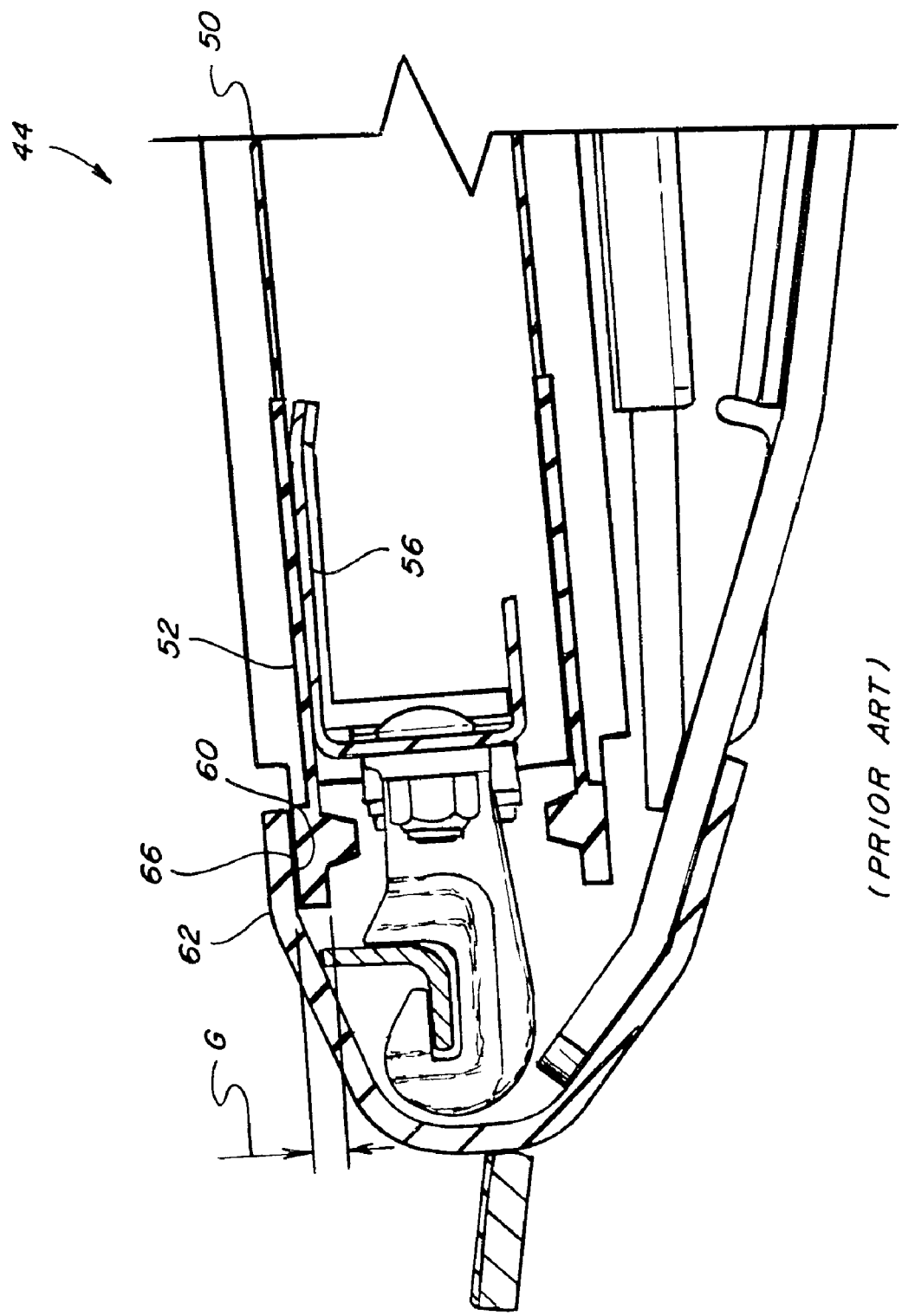
FIG. 4 is a fragmentary sectional view of still another prior art header, showing another known seal arrangement between a draper canvas and cutter bar of the header.

Referring also to FIGS. 2, 3 and 4, several prior art embodiments of a header 44 are shown, including various prior art draper canvasses 46, 48 and 50, respectively, which have been found to suffer from the shortcomings discussed above under the Background Art heading, namely, infiltration of cut crop and material through an interface between the front edge of the draper canvas and the cutter bar, friction, and premature wear. The various aspects of draper canvasses 46, 48 and 50 are explained in more detail in the disclosures and drawings of U.S. Pat. Nos. 5,459,986; 6,351,931; and 7,472,533, respectively, which are incorporated herein by reference in their entirety.

Referring more particularly to FIG. 2, draper canvas 46 essentially includes a doubled front edge region 52 having a distal end 54 supported on a front draper support plate 56 such that an upper outer surface 58 of a cantilever portion of edge region 52 is positioned and oriented to engage a bottom surface 60 of a rearward extending cutter bar element 62 for forming a sealed condition therebetween. It can be observed that support plate 56 is inclined slightly upwardly toward element 62, and that a vertical gap G between plate 56 and surface 60 of element 62 is just sufficient to receive front edge region 52 of canvas 46. This single seal interface provides the sole barrier to entry of cut crop into the interior region of header 44, and it can be envisioned that as region 52 of canvas 46, and surface 60 wear, primarily as a result of friction therebetween, a larger portion of gap G will be open for infiltration of crop and other material.

Referring more particularly to FIG. 3, draper canvas 48 is constructed and supported in essentially the same manner as canvas 46, including a doubled front edge region 52 supported on a draper support plate 56 so as to contact a bottom surface 60 of a cutter bar element 62. Canvas 48 additionally includes a strip 64 extending outwardly from region 52 rearwardly adjacent to cutter bar element 62. It can be observed that canvas 48 will suffer from the same shortcomings as canvas 46, particularly, as region 52 wears, more of gap G will be open and with only a single seal interface, there is no other barrier to entry. Additionally, strip 64, because of its higher elevation compared to adjacent element 62, will likely impede smooth crop flow from the cutter bar to the draper canvas to at least some extent.

Referring also to FIG. 4, draper canvas 50 is constructed and supported in essentially the same manner as canvas 46 and 48, including a doubled front edge region 52 supported on a draper support plate and including a strip 66 extending outwardly from region 52, beneath cutter bar element 62, such that an outer surface 68 will rub bottom surface 60. Again, it can be observed that canvas 50 will suffer from the same shortcomings as canvasses 46, 48, particularly, that only a single seal interface is provided and as it wears greater infiltration will be allowed.

Figure 5:
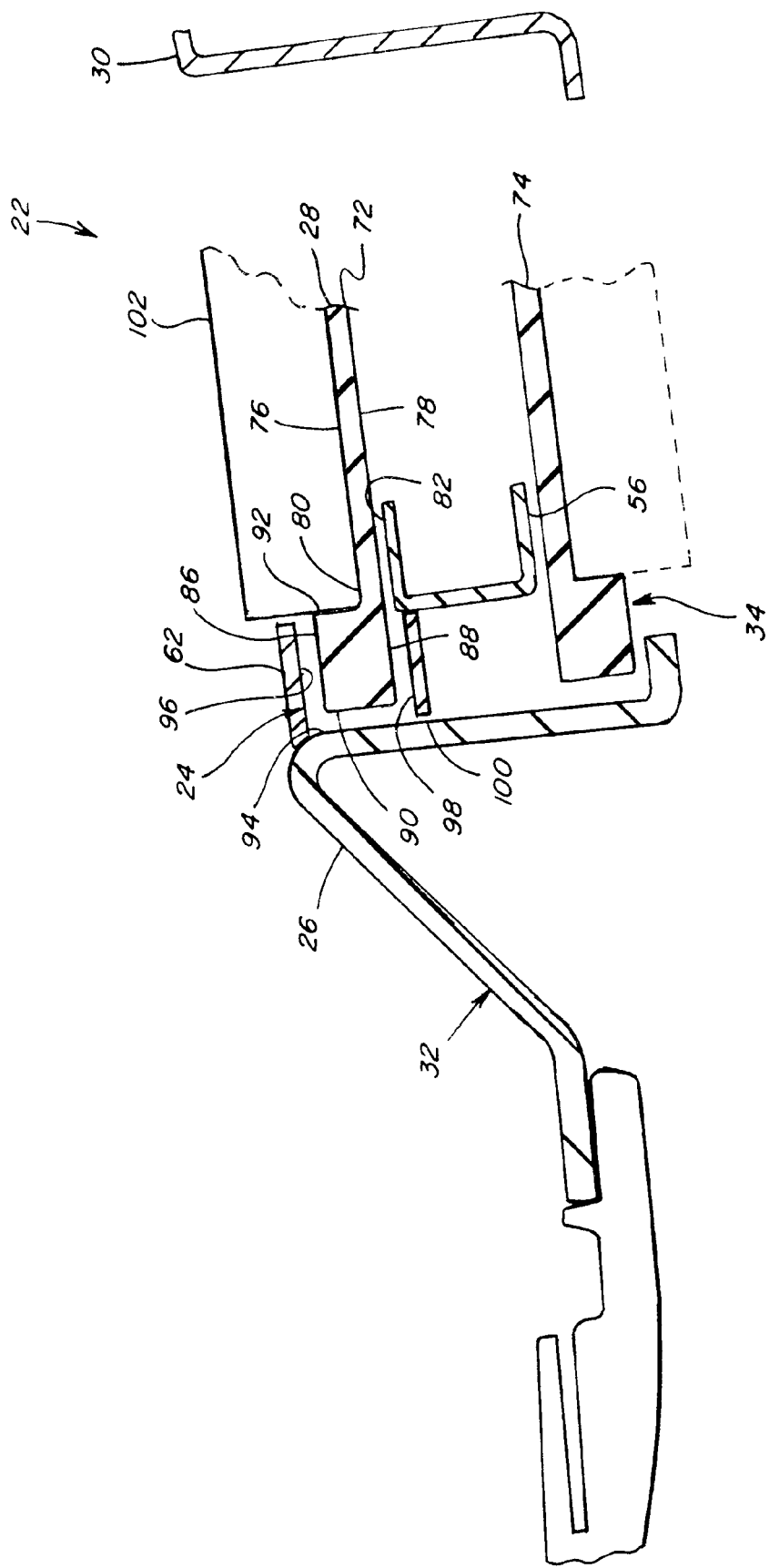
FIG. 5 is a fragmentary sectional view of the header of FIG. 1, illustrating aspects of the cut crop barrier interface of the invention.
Figure 6:
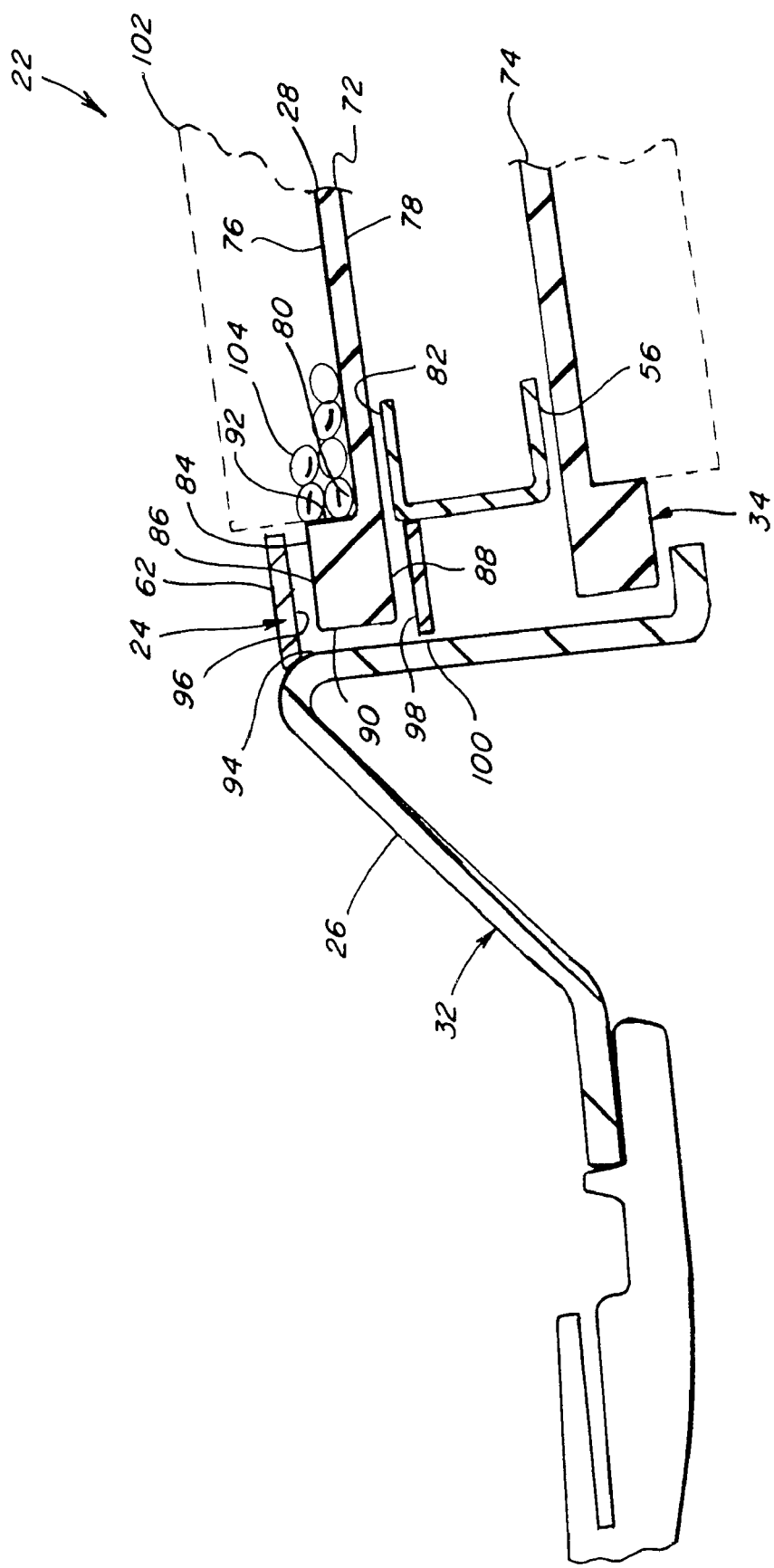
FIG. 6 is another fragmentary sectional view of the header of FIG. 1, illustrating the barrier interface and cut crop being conveyed on the draper.
Figure 7:
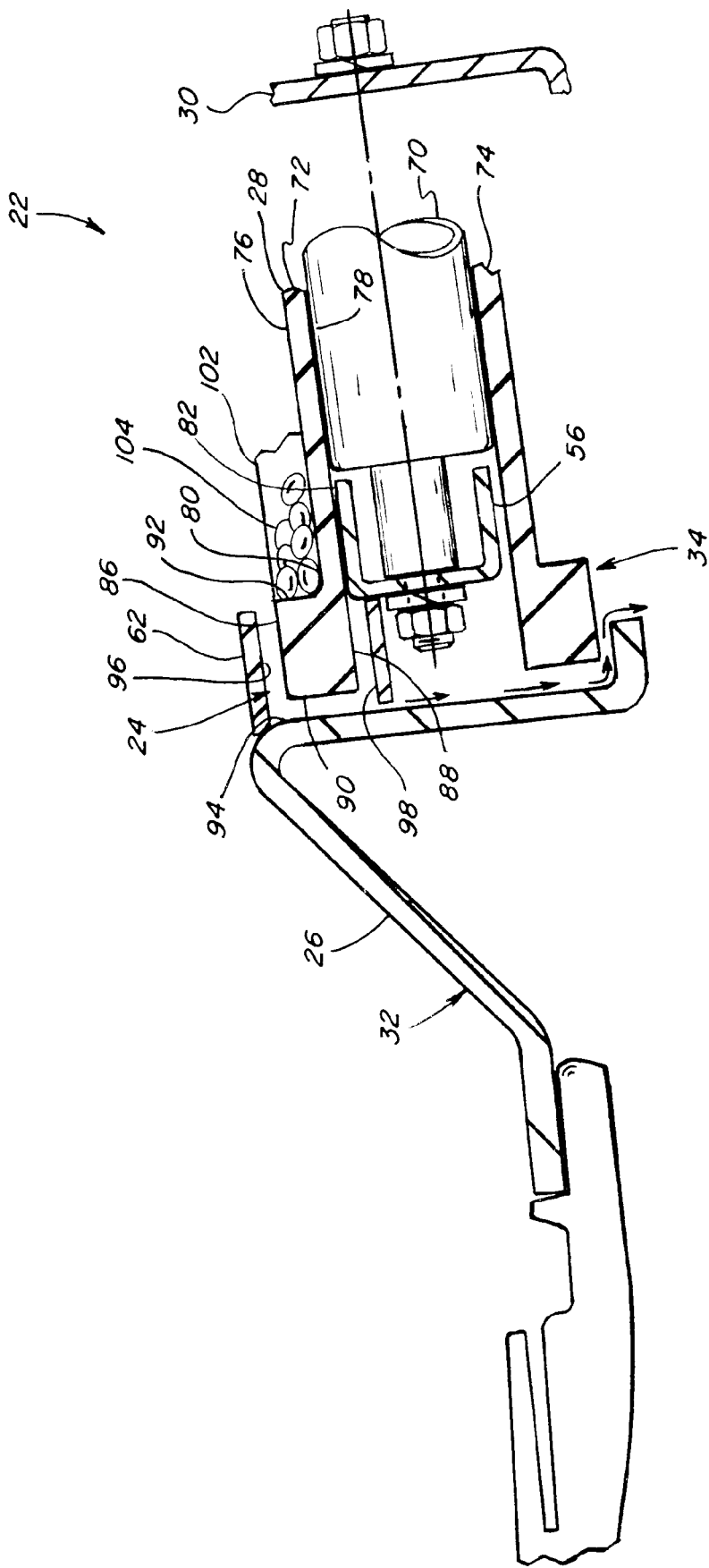
FIG. 7 is another fragmentary sectional view, showing the draper canvas supported on a front draper support plate, and the impact thereof on the barrier interface.

Referring also to FIGS. 5, 6 and 7, header 22 is shown in cross section to reveal barrier interface 24 of the invention between draper canvas 28 and cutter bar 26. Essentially, frame 30 of header 22 supports cutter bar assembly 32 and draper assembly 34 in the relationship shown. Cutter bar assembly 32 includes cutter bar 26, which includes a rearwardly extending cutter bar element 62. Draper assembly 34 includes first and second draper guide rollers, represented by roller 70 in FIG. 7, each arranged at a respective end of draper assembly 34 spaced apart along cutter bar 26 with an axis of each guide roller arranged substantially at right angles to cutter bar 26. Draper assembly 34 includes draper canvas 28 forming a continuous loop of flexible material wrapped around the rollers so as to define an elongate upper run 72 of draper canvas 28 on top of the rollers and an elongate lower run 74 below the rollers. This defines an outer surface 76 of draper canvas 28 which faces outwardly of the loop and outer surface 76 forms the upper surface of upper run 72 and the lower surface of lower run 74. An opposed inner surface 78 of draper canvas 28 faces inwardly of the loop. A front edge 80 of upper run 72 is disposed just rearwardly of cutter bar element 62, and a front draper support plate 56 has an upper surface 82 lying under upper run 72 adjacent front edge 80 thereof and extending therealong between the first and second guide rollers. Inner surface 78 can rest on or slide along surface 82, or can be suspended thereabove by tension in the draper canvas.

Importantly, front edge 80 of draper canvas 28 includes a strip 84 of a resilient material that stands outwardly from outer surface 76. Strip 84 has an outer barrier surface 86 located outwardly of outer surface 76 of canvas 28, an inner barrier surface 88 facing oppositely of outer barrier surface 86, a front barrier surface 90 extending between outer barrier surface 86 and inner barrier surface 88, and a rear surface 92 facing oppositely of front barrier surface 90 and bounding outer surface 76 of draper canvas 28. Cutter bar 26 includes an elongate front barrier element 94 extending along upper run 72 in closely spaced, face-to-face relation to front barrier surface 90 of strip 84, and an elongate upper barrier element 96 extending rearwardly over outer barrier surface 86 along upper run 72 in closely spaced, face-to-face relation to outer barrier surface 86 and angularly related to front barrier element 94. One of the cutter bar 26 or front draper support plate 56 (here plate 56) includes an elongate lower barrier element 98 angularly related to front barrier element 94 and extending beneath and in closely spaced, face-to-face relation to inner barrier surface 88 of strip 84.

As an advantage of the invention, strip 84 will be contained in and travel through a three sided enclosure defined the angularly related barrier elements 94, 96 and 98, unhindered, that is, without substantial and continuous contact between barrier surfaces 86, 88, 90, and elements 94, 96 and 98, such that friction, and resulting wear are substantially reduced or eliminated compared to the prior art seal constructions that rely on sliding contact to form a single seal interface. The face-to-face, unhindered, minimally contacting relationships forms multiple sided interface 24 between cutter bar 26 and draper canvas 28, which acts as an effective barrier to passage of cut crop and material carried thereby, by requiring any cut crop, and material carried thereby, to not only infiltrate and pass through all three of the individual face-to-face interfaces, but to also change direction while doing so, from forward to downward to rearward, to reach the interior region of header 22, while being propelled only in the rearward direction and the sideward direction of canvas travel.

As another feature, in the embodiment illustrated, lower barrier element 98 comprises an extension of front draper support plate 56, and a small gap 100 exists between the front edge of lower barrier element 98 and front barrier element 94, through which only moisture and small amounts of material can pass, so as not to build up in the space between front barrier element 94 and front barrier surface 90.

As another feature, strip 84 can be integrated with outwardly extending slats 102 of various configurations disposed at spaced locations on outer surface 76, for containing and facilitating the conveying of crop, generally represented by soybeans 104, as illustrated.

In light of all the foregoing, it should thus be apparent to those skilled in the art that there has been shown and described a draper header including an effective barrier interface between the cutter bar and drabber canvas. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A header for cutting and transporting a standing crop comprising:
    a header frame;
    an elongate cutter bar arranged along a front edge of the frame;
    a draper assembly mounted on the header frame rearwardly of the cutter bar such that cut crop will fall onto the draper assembly for transportation longitudinally of the header, the draper assembly including a first and a second draper guide roller each arranged at a respective end of the draper assembly spaced apart along the cutter bar with an axis of each guide roller arranged substantially at right angles to the cutter bar, the draper assembly including a draper canvas forming a continuous loop of flexible material wrapped around the rollers so as to define an elongate upper run of the draper canvas on top of the rollers and an elongate lower run of the draper canvas below the rollers, and so as to define an outer surface of the draper canvas which faces outwardly of the loop and such that the outer surface forms the upper surface of the upper run and the lower surface of the lower run, and an opposed inner surface of the draper canvas which faces inwardly of the loop, a front edge of the upper run of the draper canvas being disposed adjacent to a rear portion of the cutter bar, the draper assembly including a front draper support plate defining a substantially horizontal support surface lying under the upper run adjacent the front edge thereof and extending therealong between the first and second guide rollers, the draper canvas having the front edge including a strip of a resilient material that stands outwardly from the outer surface so as to have an outer barrier surface located outwardly of the outer surface of the draper canvas, an inner barrier surface facing oppositely of the outer barrier surface, a front barrier surface extending between the outer barrier surface and the inner barrier surface, and a rear surface facing oppositely of the front barrier surface and bounding the outer surface of the draper canvas; the cutter bar including an elongate front barrier element extending along the upper run of the draper canvas in closely spaced, face-to-face relation to the front barrier surface of the strip, and an elongate upper barrier element extending rearwardly over the outer barrier surface of the strip along the upper run of the draper canvas in closely spaced, face-to-face relation to the outer barrier surface and angularly related to the front barrier element, and the front draper support plate including an elongate lower barrier element angularly related to the front barrier element and extending beneath and in closely spaced, face-to-face relation to the inner barrier surface of the strip, forming an angularly related multiple barrier interface extending about the strip along the upper run of the draper canvas to inhibit entry between the cutter bar and the draper canvas of the cut crop and any material carried thereby, wherein the lower barrier element extends toward the cutter bar in cantilever relation from the front draper support plate and includes a front edge disposed in spaced relation to the front barrier element of the cutter bar, and wherein a gap is formed between the front edge of the lower barrier element and the front barrier element, through which only moisture and small amounts of material can pass, so as not to build up in the space between front barrier element and front barrier surface.

2. The header of claim 1, wherein the strip has a substantially rectangular cross sectional shape.

3. The header according to claim 1, wherein the lower barrier element is disposed at an elevation marginally lower than an elevation of the front draper support plate, such that the draper canvas is supported by the draper support plate and supports the strip in cantilever relation above the lower barrier element.

4. The header according to claim 1 wherein the draper canvas is formed of at least one layer of fabric material covered by a resilient coating.

5. The header according to claim 1 wherein the draper canvas has a plurality of longitudinally spaced apart, outwardly extending slats extending in a front to rear direction on the outer surface thereof.

6. A header for cutting and transporting a standing crop comprising:
    a header frame;
    an elongate cutter bar disposed along a front edge of the frame;
    a draper assembly mounted on the header frame rearwardly of the cutter bar in a position such that cut crop flowing rearwardly over the cutter bar will fall onto the draper assembly, the draper assembly including a first and a second draper guide roller each arranged at a respective longitudinal end of the draper assembly, the draper assembly including a draper canvas forming a continuous loop of flexible material wrapped around the rollers so as to define an elongate upper run of the draper canvas on top of the rollers, and so as to define an outer surface of the draper canvas which faces upwardly and outwardly of the loop, and an opposed inner surface of the draper canvas which faces inwardly of the loop, a front edge of the upper run of the draper canvas being disposed closely adjacent to a rear portion of the cutter bar, the draper assembly including a front draper support plate defining a substantially horizontal support surface lying under the upper run adjacent the front edge thereof and extending therealong between the first and second guide rollers, the draper canvas having a strip of a resilient material that stands outwardly from the outer surface and in front of the front edge so as to have an outer barrier surface located outwardly of the outer surface of the draper canvas, an inner barrier facing oppositely of the outer barrier surface, a front barrier surface extending between the outer barrier surface and the inner barrier surface, and a rear surface facing oppositely of the front barrier surface and bounding the outer surface of the draper canvas; the cutter bar and the front draper support plate including a plurality of barrier elements extending along the strip and defining an enclosure that contains the strip along the upper run and cooperates therewith for preventing passage of cut crop into the header, including a front barrier element in closely spaced, face-to-face relation to the front barrier surface of the strip, an upper barrier element in closely spaced, face-to-face relation to the outer barrier surface and angularly related to the front barrier element, and a lower barrier element angularly related to the front barrier element and extending beneath and in closely spaced, face-to-face relation to the inner barrier surface of the strip, wherein the lower barrier element extends toward the cutter bar in cantilever relation from the front draper support plate and includes a front edge disposed in spaced relation to the front barrier element of the cutter bar, and wherein a gap is formed between the front edge of the lower barrier element and the front barrier element, through which only moisture and small amounts of material can pass, so as not to build up in the space between front barrier element and front barrier surface.

7. The header of claim 6, wherein the strip has a substantially rectangular cross sectional shape.

8. The header according to claim 6, wherein the lower barrier element is disposed at an elevation marginally lower than an elevation of the front draper support plate, such that the draper canvas is supported by the draper support plate and supports the strip in cantilever relation above the lower barrier element.

9. The header according to claim 6 wherein the draper canvas is formed of at least one layer of fabric material covered by a resilient coating.

10. The header according to claim 6 wherein the draper canvas has a plurality of longitudinally spaced apart, outwardly extending slats extending in a front to rear direction on the outer surface thereof.

11. A header for cutting and transporting a standing crop comprising:
an elongate cutter bar having a front end portion carrying sickle apparatus for cutting the crop and a front to rear extending upper element for carrying the cut crop rearwardly;
a draper assembly disposed at the rear of the cutter bar in a position such that cut crop flowing rearwardly over the cutter bar will fall onto the draper assembly, the draper assembly including a first and a second draper guide roller each arranged at a respective longitudinal end of the draper assembly, the draper assembly including a draper canvas forming a continuous loop of flexible material wrapped around the rollers so as to define an elongate upper run of the draper canvas on top of the rollers, and so as to define an outer surface of the draper canvas which faces upwardly and outwardly of the loop, and an opposed inner surface of the draper canvas which faces inwardly of the loop, a front edge of the upper run of the draper canvas being disposed just rearwardly of an upper rear edge portion of the cutter bar, the draper assembly including a front draper support plate defining a substantially horizontal support surface lying under the upper run adjacent to the front edge thereof and extending therealong between the first and second guide rollers, the draper canvas including a strip of a resilient material that stands outwardly from the outer surface and in front of the front edge so as to have an outer barrier surface located outwardly of the outer surface of the draper canvas, an inner barrier surface facing oppositely of the outer barrier surface, a front barrier surface extending between the outer barrier surface and the inner barrier surface, and a rear surface facing oppositely of the front barrier surface and bounding the outer surface of the draper canvas; the cutter bar and the front draper support plate including a plurality of barrier elements extending along the strip and containing the strip along the upper run and which cooperates therewith for preventing passage of cut crop into the header, including a front barrier element in closely spaced, face-to-face relation to the front barrier surface of the strip, an upper barrier element forward of the upper rear edge portion of the cutter bar and in closely spaced, face-to-face relation to the outer barrier surface and angularly related to the front barrier element, and a lower barrier element angularly related to the front barrier element and extending beneath and in closely spaced, face-to-face relation to the inner barrier surface of the strip, wherein the lower barrier element extends toward the cutter bar in cantilever relation from the front draper support plate and includes a front edge disposed in spaced relation to the front barrier element of the cutter bar, and wherein a gap is formed between the front edge of the lower barrier element and the front barrier element, through which only moisture and small amounts of material can pass, so as not to build up in the space between front barrier element and front barrier surface.

12. The header of claim 11, wherein the strip has a substantially rectangular cross sectional shape.

13. The header according to claim 11, wherein the lower barrier element is disposed at an elevation marginally lower than an elevation of the front draper support plate, such that the draper canvas is supported by the draper support plate and supports the strip in cantilever relation above the lower barrier element.

14. The header according to claim 11 wherein the draper canvas is formed of at least one layer of fabric material covered by a resilient coating.

15. The header according to claim 11 wherein the draper canvas has a plurality of longitudinally spaced apart, outwardly extending slats extending in a front to rear direction on the outer surface thereof.

* * * * *